United States Patent [19]

Takahashi

[11] Patent Number: 5,475,406
[45] Date of Patent: Dec. 12, 1995

[54] APPARATUS FOR CONVEYING IMAGE RECORDING SHEETS

[75] Inventor: Tatsuya Takahashi, Kanagawa, Japan

[73] Assignee: Fuji Photo Film Co., Ltd., Kanagawa, Japan

[21] Appl. No.: 42,790

[22] Filed: Apr. 6, 1993

[30] Foreign Application Priority Data

Apr. 6, 1992 [JP] Japan ..................... 4-083982

[51] Int. Cl.⁶ ..................... B41J 2/385
[52] U.S. Cl. ..................... 347/154; 347/226
[58] Field of Search ..................... 346/1.1, 766, 107 R, 346/108, 110 R, 33 M; 250/491; 347/154, 226, 139, 153, 262, 264

[56] References Cited

U.S. PATENT DOCUMENTS 3,777,163  12/1973  Aubin et al. ..................... 250/491
4,315,318   2/1982  Kato et al. .

FOREIGN PATENT DOCUMENTS 0098596  1/1988  European Pat. Off. .

59-7946  1/1984  Japan .

*Primary Examiner*—Mark J. Reinhart
*Attorney, Agent, or Firm*—Sughrue, Mion, Zinn, Macpeak & Seas

[57] ABSTRACT

An apparatus for conveying an image recording sheet comprises a conveyor belt for conveying an image recording sheet, which can be attracted by magnetic attraction and is placed on a front surface of the conveyor belt. A magnet device is located on the side of a back surface of the conveyor belt and causes the image recording sheet to be held on a front surface of a conveyor belt by magnetic attraction such that the image recording sheet may be in close contact with the front surface of the conveyor belt. The magnet device comprises a belt support member and magnet bodies. The a belt support member is provided with support surface portions, which are in contact with the back surface of the conveyor belt and which support the conveyor belt at a predetermined height position, and re-entrant portions, which sink to positions lower than the support surface portions. The support surface portions and the re-entrant portions are located alternately. The magnet bodies are respectively located in the re-entrant portions of the belt support member such that the magnet bodies may not be in contact with the back surface of the conveyor belt.

8 Claims, 2 Drawing Sheets

APPARATUS FOR CONVEYING IMAGE RECORDING SHEETS

BACKGROUND OF THE INVENTION

1. Field of the Invention

This invention relates to an apparatus for conveying an image recording sheet, such as a stimulable phosphor sheet. This invention particularly relates to an apparatus for accurately conveying an image recording sheet by causing the image recording sheet to be held on a front surface of a conveyor belt by magnetic attraction such that the image recording sheet may be in close contact with the front surface of the conveyor belt.

2. Description of the Prior Art

As image recording sheets, there have heretofore been known stimulable phosphor sheets as disclosed in, for example, U.S. Pat. No. 4,315,318. The stimulable phosphor sheet is provided with a layer of a stimulable phosphor capable of storing a radiation image thereon. The radiation image, which has been stored on the stimulable phosphor layer, is read out by exposing the stimulable phosphor to stimulating rays, which cause it to emit light in proportion to the amount of energy stored thereon during its exposure to radiation, the emitted light being detected photoelectrically. Specifically, the image read-out operation is carried out by two-dimensionally scanning the stimulable phosphor sheet with a light beam serving as stimulating rays, such as a laser beam, sequentially detecting the light, which is emitted by the stimulable phosphor sheet when it is exposed to the light beam, with a photodetector, such as a photomultiplier, and thereby obtaining an image signal representing the radiation image.

In general, the two-dimensional scanning is carried out by moving the stimulable phosphor sheet in one direction, and scanning the stimulable phosphor sheet with the light beam in the direction, along which the stimulable phosphor sheet moves, and in the direction normal to the direction, along which the stimulable phosphor sheet moves. In this method, it is required for the stimulable phosphor sheet to be moved in one direction at a constant speed. Specifically, if the stimulable phosphor sheet is not moved accurately at a predetermined speed, read-out nonuniformity will occur during the operation for scanning the stimulable phosphor sheet and reading out the radiation image therefrom. As a result, when a final visible image is reproduced from an image signal obtained from the image read-out operation, a visible image having uniform image density cannot be obtained. Therefore, an accurate mechanism is required to move the stimulable phosphor sheet.

As the mechanism for moving a stimulable phosphor sheet, there has heretofore been known a mechanism, wherein the stimulable phosphor sheet is placed on a front surface of a conveyor belt, and the conveyor belt is moved at a predetermined speed. In this case, such that the stimulable phosphor sheet may not shift in position from the conveyor belt, it is important to hold the stimulable phosphor sheet on the front surface of the conveyor belt such that the image recording sheet may be in close contact with the front surface of the conveyor belt. As the method for holding the stimulable phosphor sheet on the front surface of the conveyor belt such that the image recording sheet may be in close contact with the front surface of the conveyor belt, a method has been proposed in, for example, Japanese Unexamined Patent Publication No. 59(1984)-7946. With the proposed method, a magnetic material layer is overlaid on the back surface of a stimulable phosphor sheet such that the stimulable phosphor sheet may be attracted by magnetic attraction. The stimulable phosphor sheet is held on the front surface of a conveyor belt by magnetic attraction of a magnet, which is located on the back surface side of the conveyor belt, such that the image recording sheet may be in close contact with the front surface of the conveyor belt.

However, several problems are encountered in cases where a stimulable phosphor sheet is brought into close contact with the front surface of a conveyor belt by using a magnet. For example, in cases where the magnet is located such that it may be in contact with the back surface of the conveyor belt, resistance occurs against the conveyor belt due to friction with the magnet. If the resistance is large, the speed, with which the conveyor belt moves, will fluctuate, or the magnet will get worn quickly. In order to eliminate such problems, it is necessary that the wear-resistant properties of the magnet are improved, that the coefficient of friction of the magnet is lowered, and that the conveyor belt is driven with a high-torque motor. Therefore, the cost of the mechanism for moving a stimulable phosphor sheet cannot be kept low.

It is also considered to solve the aforesaid problems by locating the magnet in spaced relation to the back surface of the conveyor belt such that the magnet may not come into contact with the back surface of the conveyor belt. In such cases, the problems occur in that, when the stimulable phosphor sheet is attracted by the magnet, the conveyor belt bends, and the height position of the surface of the conveyor belt fluctuates. If the height position of the surface of the conveyor belt fluctuates, the height position of the front surface of the stimulable phosphor sheet will also fluctuate. Fluctuations in the height position of the front surface of the stimulable phosphor sheet also cause read-out nonuniformity to occur during the operation for reading out an image from the stimulable phosphor sheet by scanning it with a laser beam.

SUMMARY OF THE INVENTION

The primary object of the present invention is to provide an apparatus for accurately conveying an image recording sheet, such as a stimulable phosphor sheet, by causing the image recording sheet to be held on a front surface of a conveyor belt by magnetic attraction such that the image recording sheet may be in close contact with the front surface of the conveyor belt, which apparatus has a simple structure and moves the image recording sheet such that the height position of the front surface of the image recording sheet may not fluctuate.

Another object of the present invention is to provide an apparatus for conveying an image recording sheet, which is low in cost.

The present invention provides a first apparatus for conveying an image recording sheet, comprising:

i) a conveyor belt for conveying an image recording sheet capable of being attracted by magnetic attraction, which image recording sheet is placed on a front surface of the conveyor belt, and ii) a magnet means, which is located on the side of a back surface of the conveyor belt, and which causes the image recording sheet to be held on a front surface of a conveyor belt by magnetic attraction such that the image recording sheet may be in close contact with the front surface of the conveyor belt, wherein the magnet means comprises:

a) a belt support member provided with support surface portions, which are in contact with the back surface of the conveyor belt and which support the conveyor belt at a predetermined height position, and re-entrant portions, which sink to positions lower than the support surface portions, the support surface portions and the re-entrant portions being located alternately, and b) magnet bodies, which are respectively located in the re-entrant portions of the belt support member, and which are not in contact with the back surface of the conveyor belt.

The present invention also provides a second apparatus for conveying an image recording sheet, comprising:

i) a conveyor belt for conveying an image recording sheet capable of being attracted by magnetic attraction, which image recording sheet is placed on a front surface of the conveyor belt, and ii) a magnet means, which is located on the side of a back surface of the conveyor belt, and which causes the image recording sheet to be held on a front surface of a conveyor belt by magnetic attraction such that the image recording sheet may be in close contact with the front surface of the conveyor belt, wherein the magnet means comprises:

a) a belt support member provided with a plate-like portion, which is in contact with the back surface of the conveyor belt and which supports the conveyor belt at a predetermined height position, and b) magnet bodies, which are located on a back surface of the plate-like portion of the belt support member.

With the first apparatus for conveying an image recording sheet in accordance with the present invention, the support surface portions of the belt support member, which are in contact with the back surface of the conveyor belt, support the conveyor belt at the predetermined height position. The re-entrant portions of the belt support member are located alternately with the support surface portions. Also, the magnet bodies are respectively located in the re-entrant portions of the belt support member such that the magnet bodies may not be in contact with the back surface of the conveyor belt. The magnet bodies hold the image recording sheet on the front surface of the conveyor belt by magnetic attraction such that the image recording sheet may be in close contact with the front surface of the conveyor belt.

The magnet bodies are located such that they may not be in contact with the back surface of the conveyor belt. Therefore, the problems do not occur in that the magnet bodies become worn due to sliding on the back surface of the conveyor belt, and in that the conveyor belt suffers from resistance due to friction with the magnet bodies. Accordingly, with the first apparatus for conveying an image recording sheet in accordance with the present invention, it is not necessary that the wear-resistant properties of the magnet bodies are improved or that the coefficient of friction of the magnet bodies is lowered. The cost of the first apparatus in accordance with the present invention can thereby be kept low.

Also, the support surface portions of the belt support member are in contact with the back surface of the conveyor belt and thereby support the conveyor belt at the predetermined height position. Therefore, when the image recording sheet placed on the front surface of the conveyor belt is brought into close contact with the front surface of the conveyor belt by magnetic attraction of a plurality of the magnet bodies respectively located in the re-entrant portions of the belt support member, which re-entrant portions are located alternately with the support surface portions, such that the magnet bodies may not be in contact with the back surface of the conveyor belt, it is possible to eliminate the problems in that the conveyor belt bends and its height position fluctuates. In this manner, the height position of the image recording sheet can be prevented from fluctuating, and the accuracy of the apparatus can be kept high.

With the second apparatus for conveying an image recording sheet in accordance with the present invention, the plate-like portion of the belt support member, which is in contact with the back surface of the conveyor belt, supports the conveyor belt at the predetermined height position. Also, the magnet bodies, which are located on the back surface of the plate-like portion of the belt support member, hold the image recording sheet on the front surface of the conveyor belt by magnetic attraction such that the image recording sheet may be in close contact with the front surface of the conveyor belt.

The magnet bodies are located on the back surface of the plate-like portion of the belt support member, and therefore they are not in contact with the back surface of the conveyor belt. Therefore, the problems do not occur in that the magnet bodies become worn due to sliding on the back surface of the conveyor belt, and in that the conveyor belt suffers from resistance due to friction with the magnet bodies. Accordingly, with the second apparatus for conveying an image recording sheet in accordance with the present invention, it is not necessary that the wear-resistant properties of the magnet bodies are improved or that the coefficient of friction of the magnet bodies is lowered. The cost of the second apparatus in accordance with the present invention can thereby be kept low.

Also, the plate-like portion of the belt support member is in contact with the back surface of the conveyor belt and thereby supports the conveyor belt at the predetermined height position. Therefore, when the image recording sheet placed on the front surface of the conveyor belt is brought into close contact with the front surface of the conveyor belt by magnetic attraction of the magnet bodies, it is possible to eliminate the problems in that the conveyor belt bends and its height position fluctuates. In this manner, the height position of the image recording sheet can be prevented from fluctuating, and the accuracy of the apparatus can be kept high.

As described above, with the first and second apparatuses for conveying an image recording sheet in accordance with the present invention, the structure of the apparatus can be kept simple, and the image recording sheet can be moved such that the height position of the front surface of the image recording sheet may not fluctuate. Also, the cost of each of the first and second apparatuses in accordance with the present invention can be kept low, and the accuracy thereof can be kept high.

DESCRIPTION OF THE PREFERRED EMBODIMENTS

The present invention will hereinbelow be described in further detail with reference to the accompanying drawings.

Figure 1:
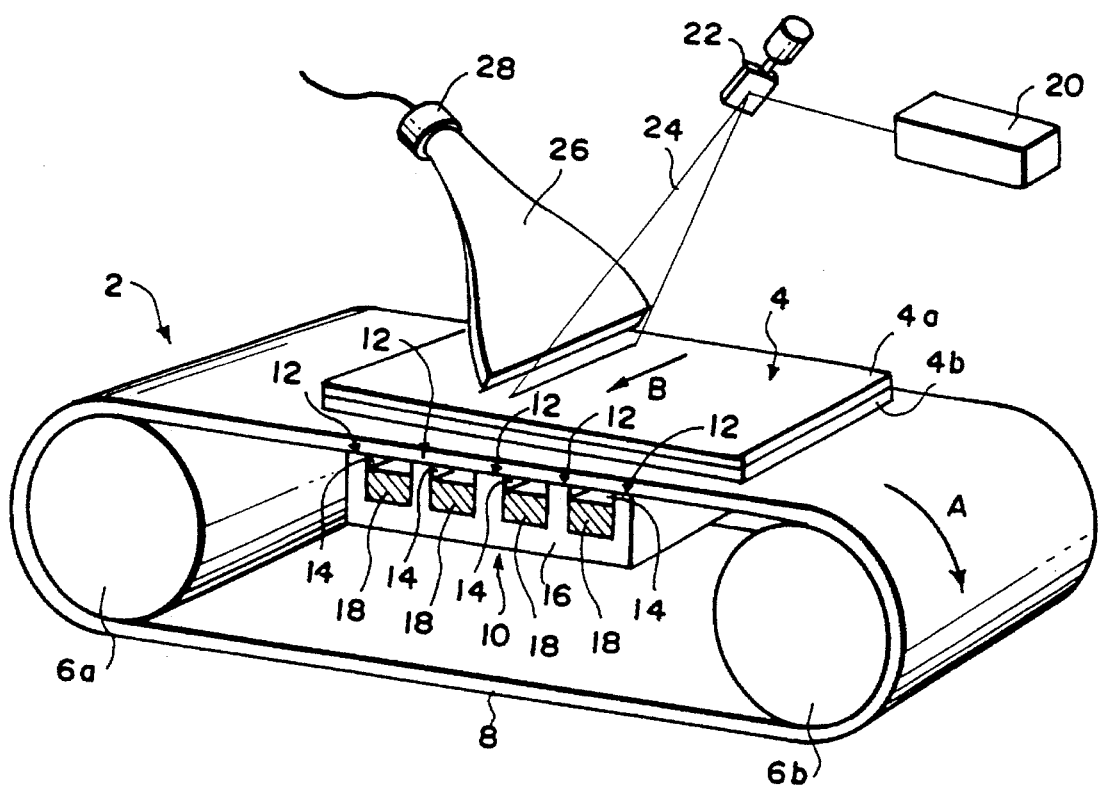
FIG. 1 is a perspective view showing an embodiment of the first apparatus for conveying an image recording sheet in accordance with the present invention.

FIG. 1 is a perspective view showing an embodiment of the first apparatus for conveying an image recording sheet in accordance with the present invention. A conveying apparatus 2 of this embodiment is used at a read-out section, at which a radiation image stored on a stimulable phosphor sheet 4 is read out therefrom.

As illustrated in FIG. 1, the conveying apparatus 2 comprises an endless conveyor belt 8, which is threaded over rollers 6a and 6b, and a magnet means 10 located on the side of the back surface of the conveyor belt 8. The magnet means 10 comprises a belt support member 16 and a plurality of magnet bodies 18, 18, . . . The belt support member 16 is provided with support surface portions 12, 12, . . . , which are in contact with the back surface of the conveyor belt 8 and which support the conveyor belt 8 at a predetermined height position. The belt support member 16 is also provided with re-entrant portions 14, 14, . . . , which sink to positions lower than the support surface portions 12, 12, . . . The support surface portions 12, 12, . . . and the re-entrant portions 14, 14, . . . are located alternately. The magnet bodies 18, 18, . . . are respectively located in the re-entrant portions 14, 14, . . . of the belt support member 16 such that the magnet bodies 18, 18, . . . may not be in contact with the back surface of the conveyor belt 8. Specifically, each of the support surface portions 12, 12, . . . extends over a length equal to the entire width of the conveyor belt 8. Each of the magnet bodies 18, 18, . . . is constituted of a bar-like permanent magnet having a length approximately equal to the width of the conveyor belt 8.

The values of the length and the width of each of the support surface portions 12, 12, . . . , the shape of each of the magnet bodies 18, 18, . . . , the distance between each of the magnet bodies 18, 18, . . . and the back surface of the conveyor belt 8, and the like, are not limited to those in this embodiment and may be set appropriately by considering the level of magnetic attraction of the magnet bodies 18, 18, . . . , or the like. Also, instead of being constituted of permanent magnets, the magnet bodies 18, 18, . . . may be constituted of electromagnets.

The stimulable phosphor sheet 4 is provided with a stimulable phosphor layer 4a, on which a radiation image has been stored and which is located on the front surface side of the stimulable phosphor sheet 4. The stimulable phosphor sheet 4 is also provided with a magnetic material layer 4b, which is capable of being attracted by magnetic attraction and which is located on the back surface side of the stimulable phosphor sheet 4. The stimulable phosphor sheet 4 is placed on the front surface of the conveyor belt 8. When the rollers 6a and 6b are rotated, and the conveyor belt 8 is thereby moved in the direction indicated by the arrow A, the stimulable phosphor sheet 4 is moved from the left side to the right side in FIG. 1. During such movement, the magnetic material layer 4b of the stimulable phosphor sheet 4 is attracted by the magnetic attraction of the magnet bodies 18, 18, . . . of the magnet means 10, and the stimulable phosphor sheet 4 is thereby held on the front surface of the conveyor belt 8 such that it may be in close contact with the front surface of the conveyor belt 8.

A laser beam 24 serving as stimulating rays is produced by a laser beam source 20. The laser beam 24 is deflected by a galvanometer mirror 22 in the direction indicated by the arrow B. When the stimulable phosphor sheet 4 is moved in the manner described above, the front surface of the stimulable phosphor layer 4a of the stimulable phosphor sheet 4 is exposed to the thus deflected laser beam 24. When the stimulable phosphor layer 4a is exposed to the laser beam 24, the exposed portion of the stimulable phosphor layer 4a emits light in proportion to the amount of energy stored thereon during its exposure to radiation. The emitted light is guided through and condensed by a light guide member 26 through total reflection. By way of example, the light guide member 26 may be made by forming an acrylic plate. The emitted light, which has thus been guided through the light guide member 26, is detected by a photodetector 28, which may be constituted of a photomultiplier. In this manner, an image signal representing the radiation image, which was stored on the stimulable phosphor layer 4a, is obtained. In this embodiment, the position, which is exposed to the laser beam 24, corresponds to the position of one of the support surface portions 12, 12, . . . of the belt support member 16.

With the conveying apparatus 2 of this embodiment, by the provision of the magnet means 10, which has the simple structure described above, the stimulable phosphor sheet 4 can be moved such that the height position thereof may not fluctuate. In this manner, the radiation image stored on the stimulable phosphor sheet 4 can be read out accurately.

Figure 2:
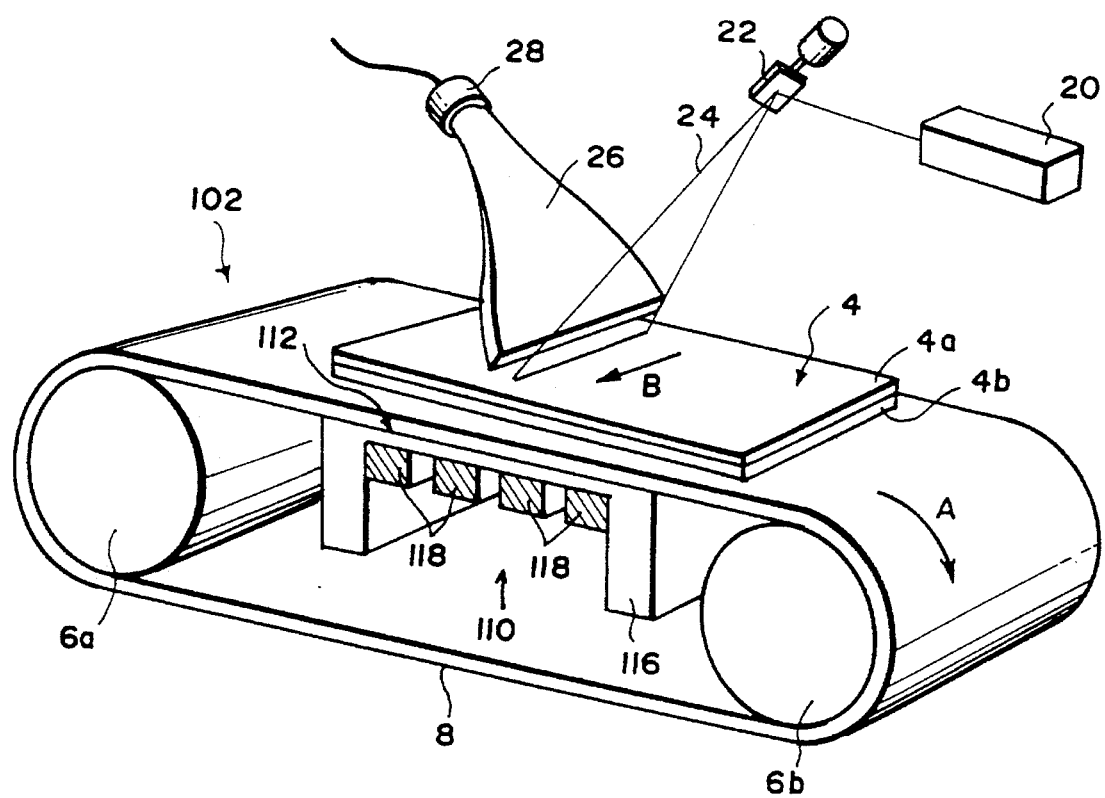
FIG. 2 is a perspective view showing an embodiment of the second apparatus for conveying an image recording sheet in accordance with the present invention.

An embodiment of the second apparatus for conveying an image recording sheet in accordance with the present invention will be described hereinbelow. Figure 2 is a perspective view showing the embodiment of the second apparatus for conveying an image recording sheet in accordance with the present invention. In FIG. 2, similar elements are numbered with the same reference numerals with respect to FIG. 1.

A conveying apparatus 102 of this embodiment is used at the read-out section, at which the radiation image stored on the stimulable phosphor sheet 4 is read out therefrom.

As illustrated in FIG. 2, the conveying apparatus 102 differs in the structure of a magnet means 110 from the conveying apparatus 2. Specifically, the magnet means 110 comprises a belt support member 116 and magnet bodies 118, 118, . . . The belt support member 116 is provided with a plate-like portion 112, which is in contact with the back surface of the conveyor belt 8 and which supports the conveyor belt 8 at a predetermined height position. The magnet bodies 118, 118, . . . are located on the back surface of the plate-like portion 112 of the belt support member 116. Specifically, the plate-like portion 112 has a width approximately equal to the width of the conveyor belt 8. Each of the magnet bodies 118, 118, . . . is constituted of a bar-like permanent magnet having a length approximately equal to the width of the plate-like portion 112. The magnet bodies 118, 118, . . . may be secured to the back surface of the plate-like portion 112 by using an adhesive agent, or the like. Alternatively, the magnet bodies 118, 118, . . . may be releasably mounted on the back surface of the plate-like portion 112 by using fixtures, or the like.

The values of the length, the width, and the thickness of the plate-like portion 112, the shape of each of the magnet bodies 118, 118, . . . , and the like, are not limited to those in this embodiment and may be set appropriately by considering the level of magnetic attraction of the magnet bodies 118, 118, . . . , or the like. Also, instead of being constituted of permanent magnets, the magnet bodies 118, 118, . . . may be constituted of electromagnets.

With the conveying apparatus 102 of this embodiment, by the provision of the magnet means 110, which has the simple structure described above, the stimulable phosphor sheet 4 can be moved such that the height position thereof may not fluctuate. In this manner, the radiation image stored on the stimulable phosphor sheet 4 can be read out accurately.

The first and second apparatuses for conveying an image recording sheet in accordance with the present invention are not limited to the aforesaid embodiments and may be embodied in various other manners.

For example, in the aforesaid embodiments, the conveyor belt 8 is constituted as the endless belt, which is threaded over the rollers 6a and 6b. Alternatively, a reciprocally movable type of belt may be employed as the conveyor belt.

Also, in the aforesaid embodiments, the conveying apparatus is employed at the read-out section, at which the radiation image stored on the stimulable phosphor sheet is read out therefrom. The first and second apparatuses for conveying an image recording sheet in accordance with the present invention are also applicable when other types of image recording sheets are moved accurately.

What is claimed is:

1. An apparatus for conveying an image recording sheet, comprising:
   i) a conveyor belt for conveying an image recording sheet capable of being attracted by magnetic attraction, wherein the image recording sheet is placed on a front surface of the conveyor belt, and
   ii) a magnet means, which is located on a side of a back surface of the conveyor belt, and which causes the image recording sheet to be held on the front surface of the conveyor belt by magnetic attraction such that the image recording sheet may be in close contact with the front surface of the conveyor belt, wherein the magnet means comprises:
   a) a belt support member provided with support surface portions, which are in contact with the back surface of the conveyor belt and which support the conveyor belt at a predetermined height position, and re-entrant portions, which sink to positions lower than said support surface portions, said support surface portions and said re-entrant portions being located alternately, and
   b) at least one magnet body, which is respectively located in at least one of said re-entrant portions of said belt support member, and which is not in contact with the back surface of the conveyor belt.

2. An apparatus as defined in claim 1 wherein the conveyor belt is an endless belt, and the magnet means is located inside of a space defined by the endless belt.

3. An apparatus as defined in claim 1 wherein the conveyor belt is a reciprocally movable belt.

4. An apparatus as defined in claim 1 wherein the image recording sheet is a stimulable phosphor sheet.

5. An apparatus for conveying an image recording sheet, comprising:
   i) a conveyor belt for conveying an image recording sheet capable of being attracted by magnetic attraction, wherein the image recording sheet is placed on a front surface of the conveyor belt, and
   ii) a magnet means, which is located on a side of a back surface of the conveyor belt, and which causes the image recording sheet to be held on the front surface of the conveyor belt by magnetic attraction such that the image recording sheet may be in close contact with the front surface of the conveyor belt, wherein the magnet means comprises:
   a) a belt support member provided with a plate-like portion, which is in contact with the back surface of the conveyor belt and which supports the conveyor belt at a predetermined height position, and
   b) at least one magnet body, which is located on a back surface of said plate-like portion of said belt support member.

6. An apparatus as defined in claim 5 wherein the conveyor belt is an endless belt, and the magnet means is located inside of a space defined by the endless belt.

7. An apparatus as defined in claim 5 wherein the conveyor belt is a reciprocally movable belt.

8. An apparatus as defined in claim 5 wherein the image recording sheet is a stimulable phosphor sheet.

* * * * *